United States Patent [19]
Gilbert et al.

[11] Patent Number: 6,079,289
[45] Date of Patent: Jun. 27, 2000

[54] DETENT MECHANISM FOR A HYDRAULIC POWER STEERING GEAR

[75] Inventors: Wendell L. Gilbert, Pleasant Shade; Michael R. Morsches, Lebanon, both of Tenn.

[73] Assignee: TRW Inc., Lyndhurst, Ohio

[21] Appl. No.: 09/189,302

[22] Filed: Nov. 10, 1998

[51] Int. Cl.[7] .................................................. B62D 5/083
[52] U.S. Cl. .................................. 74/388 PS; 91/375 A; 180/421; 137/625.21
[58] Field of Search ...................... 74/388 PS; 91/375 A, 91/375 R; 180/421; 137/625.21

[56] References Cited

U.S. PATENT DOCUMENTS

| | | |
|---|---|---|
| 4,632,204 | 12/1986 | Honaga et al. |
| 4,774,847 | 10/1988 | Breitweg. |
| 4,872,393 | 10/1989 | Rabe et al. |
| 5,233,906 | 8/1993 | Bishop et al. ........................ 91/375 A |
| 5,251,669 | 10/1993 | Bishop ................................. 91/375 A |
| 5,361,861 | 11/1994 | Miller. |
| 5,571,238 | 11/1996 | Breitweg et al. .................... 91/375 A |
| 5,707,049 | 1/1998 | Dodak. |
| 5,797,309 | 8/1998 | Eberhart .............................. 91/375 A |
| 5,957,027 | 9/1999 | Gilbert et al. ....................... 91/375 A |

*Primary Examiner*—Allan D. Herrmann
*Attorney, Agent, or Firm*—Tarolli, Sundheim, Covell, Tummino & Szabo L.L.P.

[57] ABSTRACT

A hydraulic power steering gear (10) for a vehicle comprises first and second valve members (40 and 42) which are disposed coaxial to one another and which are relatively rotatable about a first axis (38) to selectively port hydraulic fluid. The first valve member (40) has an associated axial bore (170). The axial bore (170) has a second axis (174) which extends parallel to the first axis (38). The second valve member (42) includes a cam surface (128). A plunger (200) is disposed in the axial bore (170) for movement along the second axis (174). The plunger has a detent surface (208). Springs (240) bias the plunger (200) axially toward the second valve member (42). A detent roller (220) acts between the first and second valve members (40 and 42). The detent roller (220) is located in the cam surface (128) and in the detent surface (208) in a neutral condition to provide a physically perceptible indication to a driver of the vehicle of operation between the neutral condition and an actuated condition.

21 Claims, 4 Drawing Sheets

DETENT MECHANISM FOR A HYDRAULIC POWER STEERING GEAR

FIELD OF THE INVENTION

The present invention relates to a hydraulic power steering gear and, in particular, relates to a detent mechanism for an integral hydraulic power steering gear for turning dirigible wheels of a vehicle to effect steering of the vehicle.

BACKGROUND OF THE INVENTION

Integral hydraulic power steering gears are known. "Integral" refers to a steering gear containing a manual steering mechanism, a hydraulic control valve assembly, and a hydraulic power cylinder integrated into a single unit.

The hydraulic power cylinder typically comprises a chamber divided into two chamber portions by a piston. The piston has a set of teeth which mesh with a sector gear fixed to an output shaft. The output shaft is connected via steering linkage to dirigible wheels of a vehicle to steer the vehicle when the output shaft is rotated.

The hydraulic control valve assembly controls the flow of pressurized hydraulic fluid between a hydraulic pump and one of the chamber portions to control the direction and amount of steering. The valve assembly typically comprises two relatively rotatable valve elements, one of which is connected to a rotatable input shaft coupled to the vehicle steering wheel. The other valve element is connected with a follow-up member, such as a ball screw drive, which rotates in response to movement of the piston. The ball screw drive provides a direct connection between the input shaft and the piston to allow for manual steering of the vehicle in the event of hydraulic fluid pressure loss.

It is desirable for such an integral hydraulic power steering gear to provide the driver of the vehicle with a physically perceptible indication of operation of the steering gear between a neutral steering condition, in which the vehicle is being driven in a straight line, and an actuated steering condition, in which the vehicle is being turned. It is known to use a detent mechanism to provide the aforementioned physically perceptible indication to the driver.

SUMMARY OF THE INVENTION

The present invention is a hydraulic power steering gear for a vehicle. The hydraulic power steering gear is operable between a neutral condition and an actuated condition. The hydraulic power steering gear comprises first and second valve members which are disposed coaxial to one another and which are rotatable about a first axis relative to one another to selectively port hydraulic fluid. The first valve member has an axial bore associated with the first valve member. The axial bore has a second axis which extends parallel to the first axis. The second valve member includes a cam surface. A plunger is disposed in the axial bore for movement along the second axis. The plunger has a detent surface. Spring means bias the plunger axially toward the second valve member. A detent roller acts between the first and second valve members. The detent roller is located in the cam surface and in the detent surface in the neutral condition to provide a physically perceptible indication to a driver of the vehicle of operation between the neutral condition and the actuated condition.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF A PREFERRED EMBODIMENT

Figure 1:
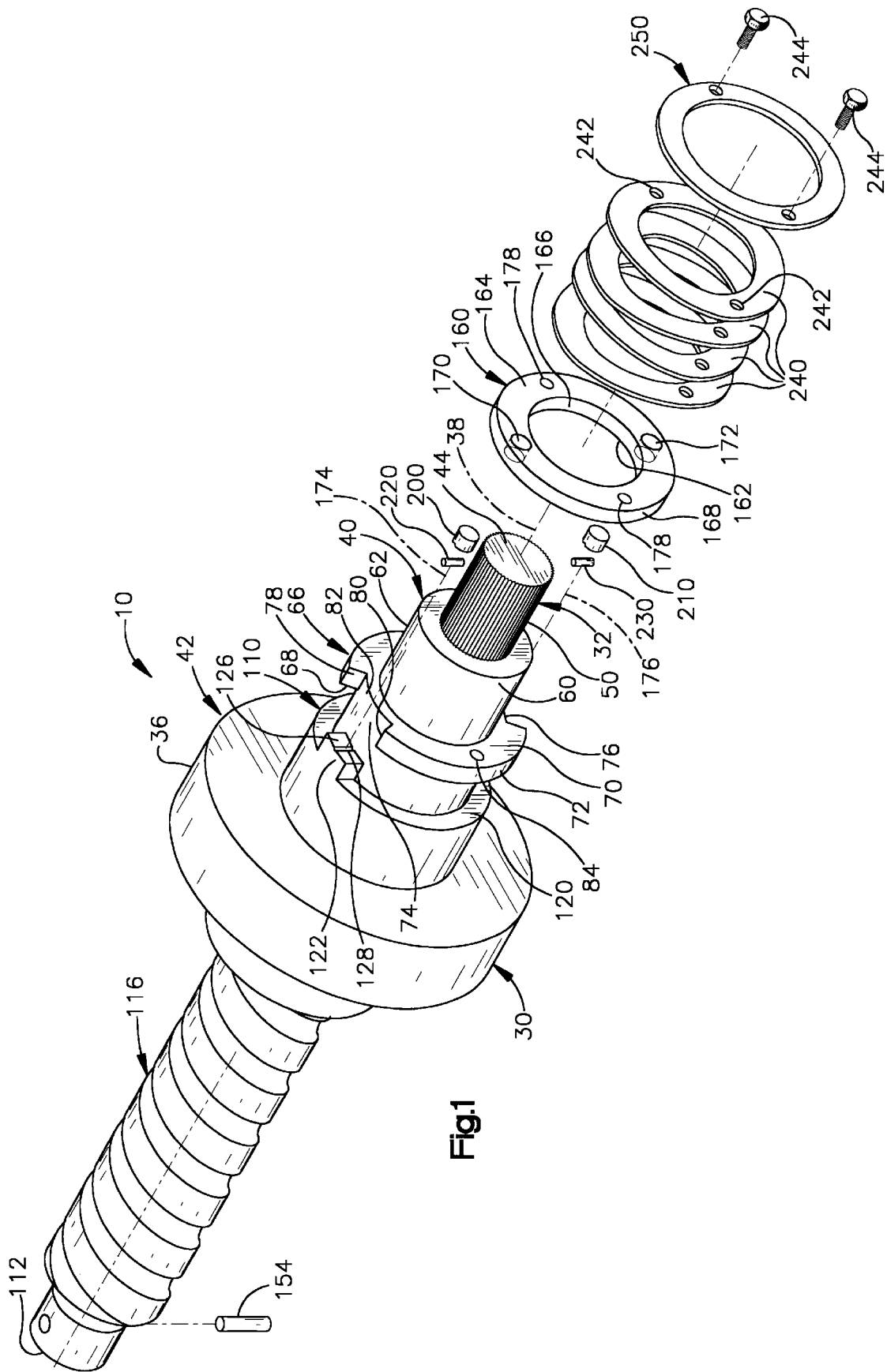
FIG. 1 is an exploded perspective view of a portion of an integral hydraulic power steering gear constructed accordance with the present invention.

The present invention is illustrated as applied to a hydraulic power steering gear 10 (FIG. 1) for turning dirigible wheels (not shown) of a vehicle to effect steering of the vehicle. The power steering gear 10 is an integral hydraulic power steering gear and includes a two-piece housing 12 (FIG. 2) having a hydraulic power cylinder 14. The power cylinder 14 comprises a chamber 16 divided into two chamber portions 18 and 20, respectively, by a piston 22. The piston 22 includes an inner bore 23 with a helical groove 24. The piston 22 also has a set of external teeth 25 which mesh with a sector gear 26. The sector gear 26 is fixed to an output shaft 28 which extends outwardly from the housing 12. The output shaft 28 is connected to a pitman arm (not shown) which, in turn, is connected via steering linkage (not shown) to the dirigible wheels of the vehicle to steer the vehicle. As the piston 22 moves in the chamber 16, the output shaft 28 is rotated to operate the steering linkage.

A hydraulic control valve assembly 30 controls the flow of pressurized hydraulic fluid between a hydraulic circuit including a hydraulic pump (not shown) and one of the chamber portions 18, 20 to control the direction and amount of steering. The valve assembly 30 is actuated by a rotatable input shaft 32 coupled for rotation with a manually rotatable vehicle steering wheel (not shown).

The valve assembly 30 comprises first and second valve members 34 and 36, respectively. The valve members 34, 36 are relatively rotatable about a valve axis 38. The first valve member 34 comprises a valve core 40 and the second valve member 36 comprises a valve sleeve 42. The valve core 40 is located coaxially within the valve sleeve 42 and is supported for rotation by the valve sleeve.

The valve core 40 is formed integrally as one piece with the input shaft 32. The valve core 40 has oppositely disposed first and second end portions 44 and 46, respectively, and a valve section 48 between the end portions. The first end portion 44 of the valve core 40 projects beyond the valve sleeve 42 and the second end portion 46 of the valve core lies within the valve sleeve. The first end portion 44 includes splines 50 for connecting to a steering shaft (not shown) coupled to the vehicle steering wheel.

Adjacent the first end portion 44, the valve core 40 includes a shank section 60 having a cylindrical outer surface 62 (FIG. 1). The shank section 60 of the valve core 40 further includes an annular collar 66 extending radially outward from the cylindrical outer surface 62. The collar 66 has first and second radially extending surfaces 68 and 70, respectively, connected by an axially extending peripheral surface 72. The peripheral surface 72 includes a pair of diametrically opposed radial cut-outs 74 and 76, respectively. Each of the radial cut-outs 74, 76 is defined by radially extending first and second surfaces 78 and 80, respectively, connected by an arcuate third surface 82 extending between the first and second surfaces.

The collar 66 further includes a pair of axially extending, diametrically opposed threaded openings 84, only one of which is shown. The threaded openings 84 are located between the radial cut-outs 74, 76.

The valve section 48 of the valve core 40 has a circumferentially spaced plurality of axially extending grooves 90 (FIG. 2) as is known in the art. A first portion of the grooves 90 are fluidly connected with an internal passage 92 extending from the valve section 48 of the valve core 40 to the second end portion 46. The internal passage 92 communicates via passages (not shown) with the return line of the hydraulic pump circuit. A second portion of the grooves 90 are in fluid communication with a plurality of passages 130 in the valve sleeve 42.

The valve sleeve 42 has oppositely disposed first and second ends 110 and 112, respectively (FIG. 1). The valve sleeve 42 further includes a sleeve section 114 (FIG. 2) adjacent the first end 110 and a ball screw section 116 adjacent the second end 112. An axially extending passage 118 extends from the first end 110 of the valve sleeve 42 through the sleeve section 114 and the ball screw section 116 to the second end 112.

The first end 110 of the valve sleeve 42 includes a radially extending surface 120 (FIG. 1). First and second lugs 122 and 124 (FIGS. 1, 3, and 4) project axially from the radially extending surface 120. The lugs 122 and 124 are diametrically opposed to one another and are dimensionally smaller than the diametrically opposed cut-outs 74 and 76 in the valve core 40. As may be seen in FIGS. 3 and 4, the lugs 122 and 124 are disposed in the cut-outs 74 and 76, respectively and are adapted to engage one of the first and second surfaces 78 and 80 defining each cut-out upon rotation of between 20 and 80 of the valve core 40 relative to the valve sleeve 42. The engagement of the lugs 122 and 124 with the cut-outs 74 and 76, respectively, in the valve core 40 causes the valve sleeve 42 to be rotated along with the valve core. Such rotation of the valve sleeve 42 causes the piston 22 to move axially in the chamber 16 and, hence, allows for manual steering of the vehicle even if a loss in hydraulic fluid pressure has occurred.

Figure 3:
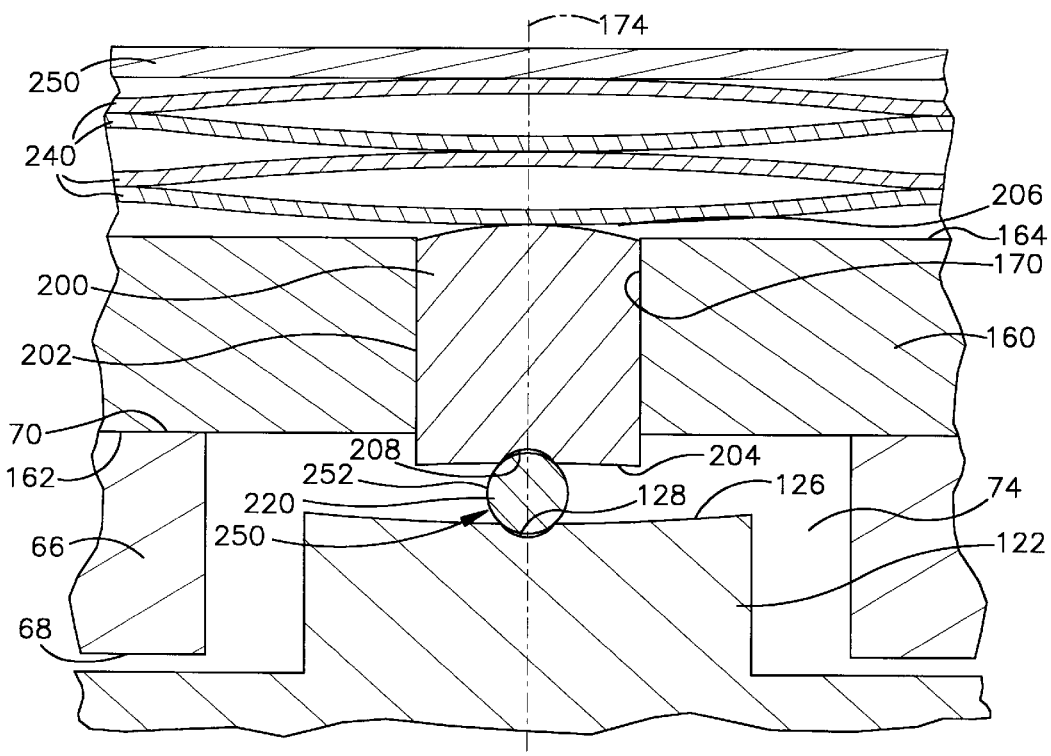
FIG. 3 is a sectional view taken along line 3—3 in FIG. 2 showing the hydraulic power steering gear in a neutral condition.
Figure 4:
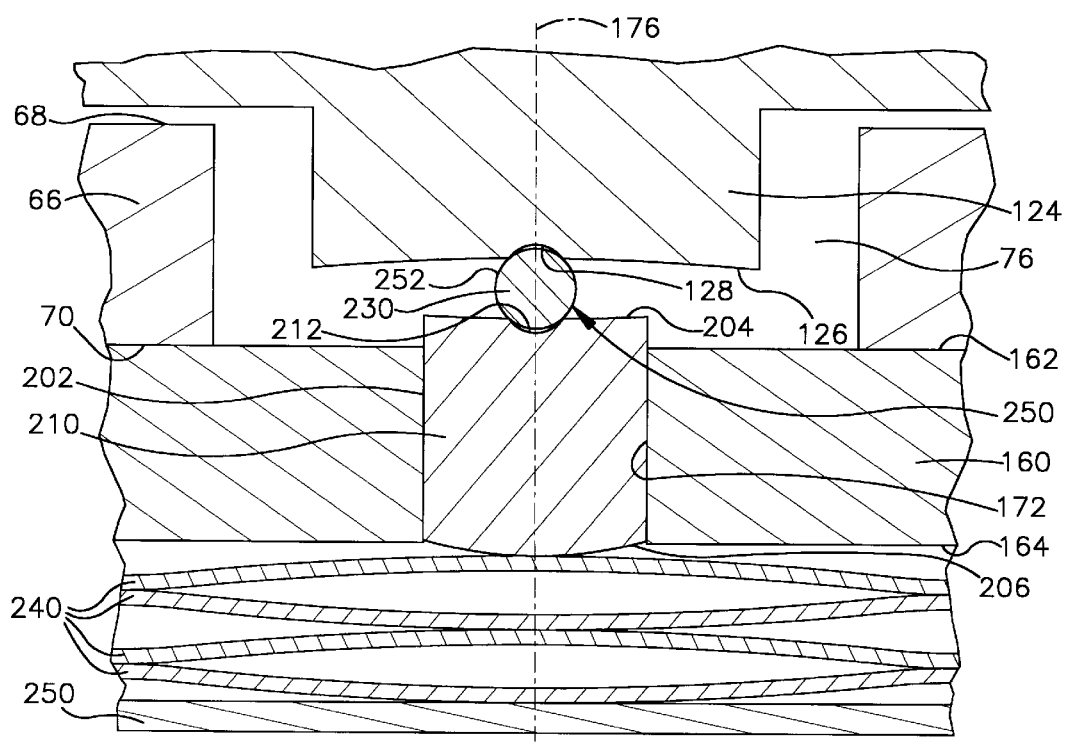
FIG. 4 is a sectional view of taken along line 4—4 in FIG. 2 with the hydraulic power steering gear in the neutral steering condition.

Each of the lugs 122, 124 includes a radially extending end surface 126 (FIGS. 1, 3, and 4). Each of the end surfaces 126 has a cam surface 128 which has a radially extending semi-cylindrical configuration.

The sleeve section 114 of the valve sleeve 42 includes the plurality of passages 130 (FIG. 2) which extend from the outer circumference of the sleeve section to the inner circumference. The passages 130 communicate with an annular chamber 132 in the housing 12 which is fluidly connected to the hydraulic pump. A plurality of axially extending grooves 134 are formed in the inner surface of the valve sleeve 42 as is known in the art. The grooves 134 fluidly communicate with the second portion of the grooves 90 in the valve core 40. Further, a first portion of the grooves 134 in the valve sleeve 42 are fluidly connected via passages (not shown) with the first chamber portion 18 in the housing 12, and a second portion of the grooves 134 fluidly connected via passages (not shown) with the second chamber portion 20 in the housing. As is known in the art, when the valve core 40 is rotated relative to the valve sleeve 42, hydraulic fluid is ported through the grooves 90 and 134 and associated passages to one of the chamber portions 18 and 20, while the hydraulic fluid is vented from the other chamber portion, thereby causing the piston 22 to move accordingly.

The ball screw section 116 of the valve sleeve 42 includes a helical groove 140 formed on its outer periphery. A plurality of balls 142 are located in the helical groove 140. The balls 142 are also located in the helical groove 24 in the bore 23 formed in the piston 22. As is well known in the art, axial movement of the piston 22 causes the ball screw portion 116 to rotate which, in turn, causes the rest of the valve sleeve 42 to rotate.

A torsion bar 150 connects the valve core 40 and the valve sleeve 42. One end of the torsion bar 150 is connected by a pin 152 to the valve section 48 of the valve core 40, while the other end of the torsion bar extends through the passage 118 in the valve sleeve 42 and is connected by a pin 154 adjacent the second end 112 of the valve sleeve.

The steering gear 10 includes a ring member 160 (FIG. 1) which is attached to the valve core 40. The ring member 160 has parallel first and second radially extending surfaces 162 and 164 (FIG. 1), respectively, which are connected by cylindrical inner and outer surfaces 166 and 168, respectively (FIG. 1). The first radially extending surface 162 of the ring member 160 abuts the radially extending surface 70 of the collar 66 of the valve core 40 FIGS. 3 and 4).

First and second axial bores 170 and 172 (FIG. 2), respectively, are formed in the ring member 160 and extend between the radially extending surfaces 162 and 164. The axial bores 170 (FIG. 3) are located diametrically opposite one another and have an identical circular configuration. The first axial bore 170 is centered on an axis 174 which extends parallel to the axis 38, and the second axial bore is centered on an axis 176 (FIG. 4) which extends parallel to the axis 38. The first and second axial bores 170 and 172 axially align with the first and second lugs 122 and 124 on the valve sleeve 42. The ring member 160 further includes a pair of diametrically opposed clearance holes 178 (FIG. 2) extending axially between the radially extending surfaces 162 and 164.

Figure 2:
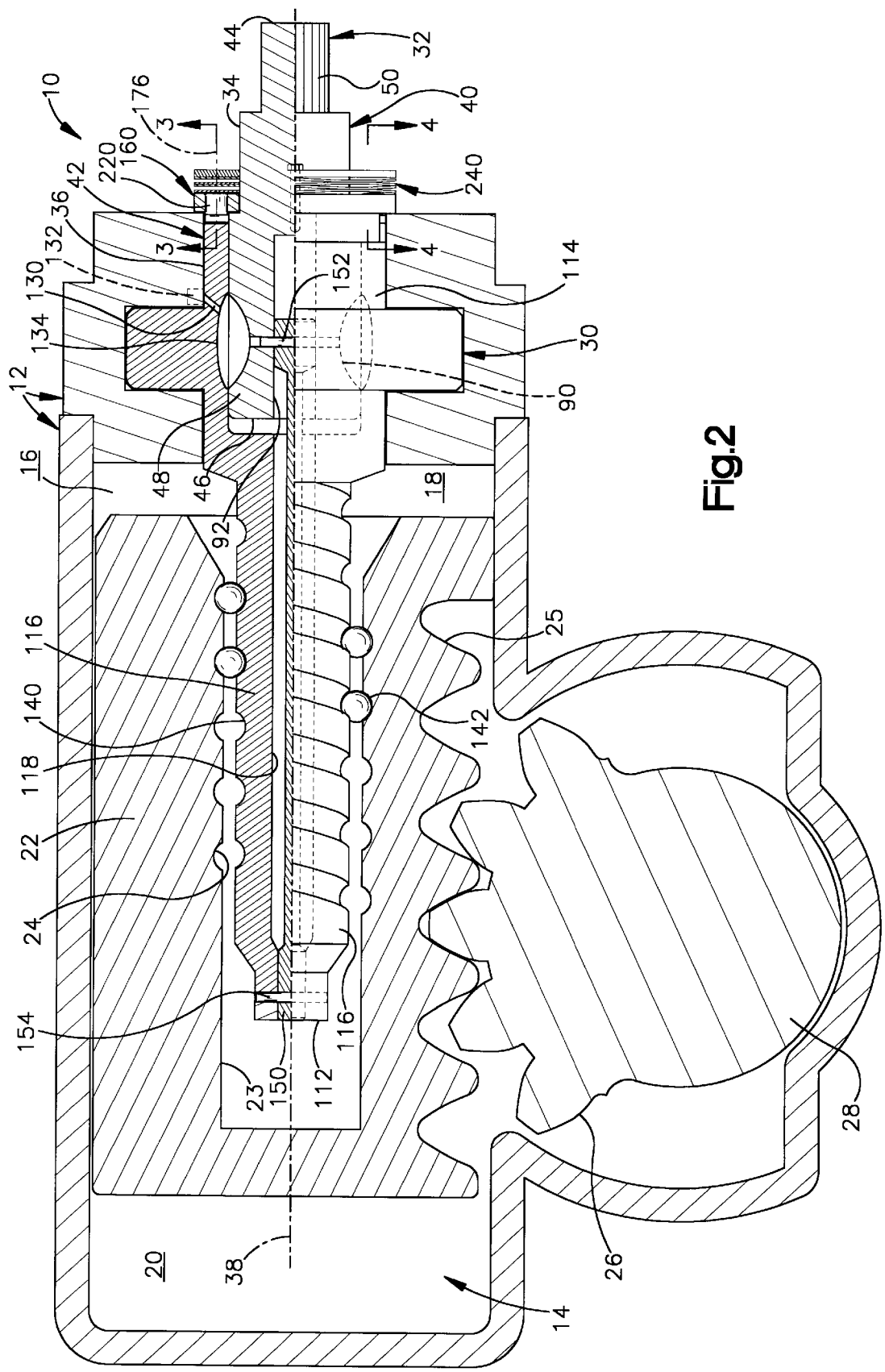
FIG. 2 is a sectional view of the hydraulic power steering gear of FIG. 1.

The hydraulic power steering gear 10 further includes first and second plungers 200 and 210, respectively, and first and second detent rollers 220 and 230, respectively (FIG. 2). The first and second plungers 200 and 210 are identical in shape and are disposed diametrically opposite one another in the axial bores 170 and 172, respectively, in the ring member 160 (FIGS. 3 and 4).

Each of the plungers 200, 210 has a cylindrical outer surface 202 extending between parallel first and second end surfaces 204 and 206, respectively. The first surface 204 of the first plunger 200 includes a radially extending detent surface 208. The first end surface 204 of the second plunger 210 includes a radially extending detent surface 212. According to a preferred embodiment of the invention, the detent surfaces 208, 212 have a transversely extending semi-cylindrical configuration. According to one embodiment of the invention, the detent surfaces 208, 212 have a radius of curvature which is approximately the same size as the radius of curvature of the cam surfaces 128 in the lugs 122, 124.

The detent rollers 220, 230 are disposed diametrically opposite one another between the lugs 122, 124 and the plungers 200, 210. More particularly, the first and second detent rollers 220 and 230 are located between the end surfaces 126 of the first and second lugs 122 and 124 and the first end surfaces 204 of the first and second plungers 200 and 210, respectively. The first and second detent rollers 220 and 230 thus act between the valve sleeve 42 and the valve core 40.

The first and second detent rollers 220 and 230 are identical in configuration. According to a preferred embodiment of the invention, the detent rollers 220, 230 comprise radially oriented pins 250. Each of the pins 250 has a cylindrical outer surface 252 extending transverse to the axis 38. Preferably, the radius of curvature of the pins 250 is slightly larger than the radius of curvature of the detent surfaces 208 and 212 in the plungers 200 and 210, respectively, and is also slightly larger the radius of curvature of the cam surfaces 128 in the lugs 122 and 124.

The hydraulic power steering gear 10 further includes a plurality of annular springs 240 (FIG. 1) which bias the first and second plungers 200 and 210 axially toward the valve sleeve 42. The springs 240 abut the second end surface 206 of each of the plungers 200, 210. Each of the springs 240 has an axially undulating configuration and includes a diametrically opposed pair of clearance openings 242. A threaded fastener 244 extends through each of the clearance holes 242 in the springs 240 and through the clearance holes 178 in the ring member 160. The fasteners 244 are received in the threaded openings 84 in the collar 66 on the valve core 40 to secure the springs 240 and the ring member 160 to the valve core. An optional washer 250 may be used to provide a flat surface for the fasteners 244 to clamp down upon.

The steering gear 10 is operable between a neutral steering condition, in which the vehicle is being driven in a straight line, and an actuated steering condition, in which the vehicle is being turned, to steer the vehicle. In the neutral condition shown in FIGS. 3 and 4, the first detent roller 220 is disposed in a first one of the cam surfaces 128 in the first lug 122, and is also disposed in the detent surface 208 in the first plunger 200. Similarly, the second detent roller 230 is disposed in the other cam surface 128 in the second lug 124, and is also disposed in the detent surface 212 in the second plunger 210.

Figure 5:
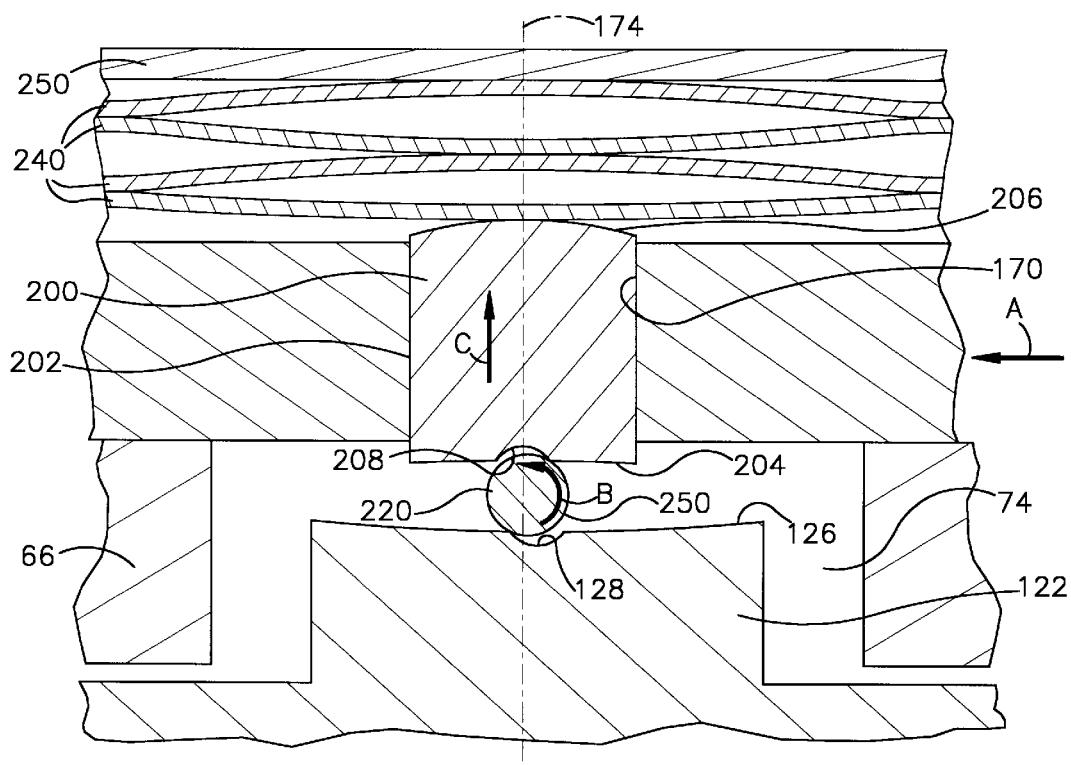
FIG. 5 is a view similar to FIG. 3 showing the hydraulic power steering gear in an actuated condition.

When the vehicle steering wheel is turned by the driver, the valve core 40 and the ring member 160 are rotated relative to the valve sleeve 42. This relative rotation, shown in FIG. 5 as rotation in the direction of arrow A, causes the first and second detent rollers 220 and 230 to rotate in the direction indicated by arrow B and to move out of the cam surfaces 128 in the lugs 122 and 124, and out of the detent surfaces 208 and 212 in the plungers 200 and 210, respectively. The movement of the detent rollers 220, 230 applies an axially directed force against the first end surface 204 of each of the plungers 200 and 210, causing the plungers to move axially away from the valve sleeve 42 in the direction of arrow C against the bias of the springs 240.

A change in steering torque needed for the driver to turn the vehicle steering wheel is felt by the driver when the detent rollers 220 and 230 are moved in and out of the cam surfaces 128 and the detent surfaces 208, 212. As graphically depicted in FIG. 6, the steering torque is highest when the steering gear 10 is initially moved from the neutral condition to the actuated condition, such as during a lane change. During further rotation of the steering wheel and, thus, the valve core 40, the steering torque required to turn the steering wheel tapers off. As the steering wheel is returned toward the neutral steering condition though, the steering torque required, and thus felt by the driver, again increases. This increase in steering torque results from the detent members approaching a re-positioning of themselves in the arcuate notches 184 and the arcuate indentations 222. When the detent rollers 220 and 230 are once again disposed in the cam surfaces 128 and in the detent surfaces 208 and 212, respectively, the steering torque drops to zero. The aforementioned changes in steering torque required to operate the steering gear 10 between the neutral condition and the actuated condition are physically perceptible by the driver of the vehicle and thus provide the driver with a feel for when the steering gear is "on-center". The difference C shown in the torque curve is the result of friction in the steering gear 10. It should be noted that the contribution of the torsion bar 150 to the steering torque is not shown in the graph of FIG. 6.

Figure 6:
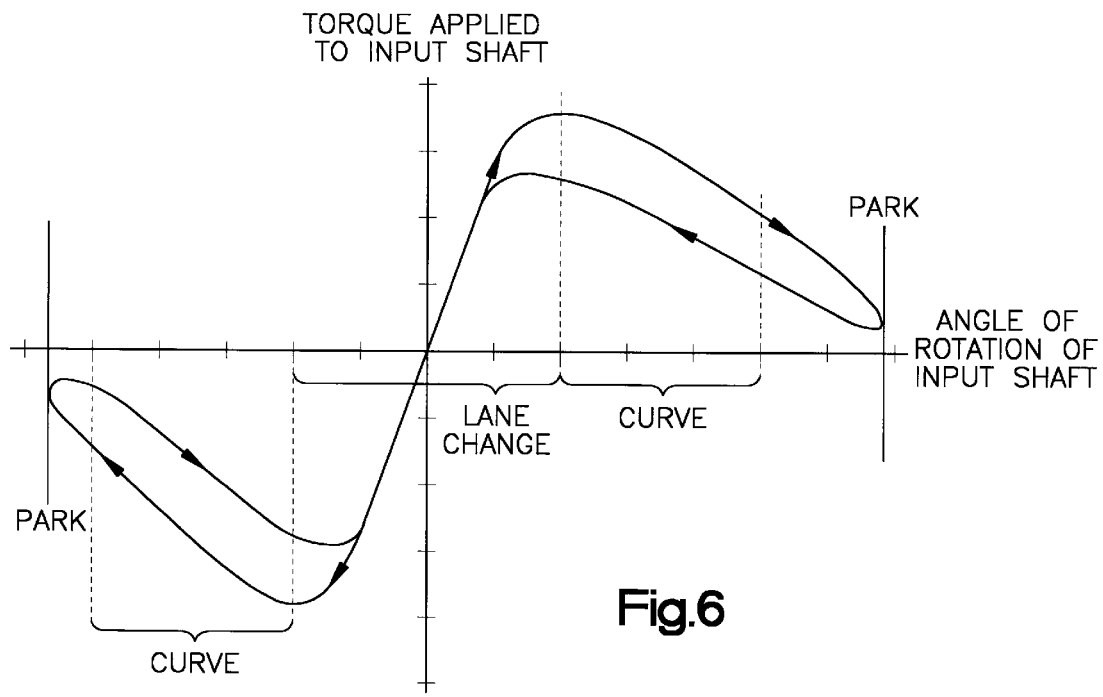
FIG. 6 is a graph of the torque required to rotate the hydraulic power steering gear versus the angle of rotation of the hydraulic power steering gear.

The magnitude of the steering torque required to operate the steering gear 10 in and out of the neutral condition is determined by the size and/or shape of the cam surfaces 128 and the detent surfaces 208, 212. For example, if the radii of curvature of the cam surfaces 128 and the detent surfaces 208, 212 were substantially smaller than the radius of curvature of the detent rollers 220 and 230, the steering torque needed to move the detent rollers in and out of the cam surfaces and the detent surfaces would be decreased. Further, it is contemplated that the radii of curvature for the cam surfaces 128 and the detent surfaces 208, 212 could be different from each other in order to optimize a steering torque feel for the driver. It should be noted that the contribution of the torsion bar 150 to the torque curve of FIG. 6 is omitted.

In addition to providing the driver of the vehicle with an "on-center" feel, the hydraulic power steering gear 10 is equipped to compensate for tolerance variations in the manufacturing of the ring member 160. For example, if the cam surfaces 128 were not properly located in the radial direction, the cylindrical shape of the plungers 200 and 210 will allow each of the plungers to rotate in the axial bores 170 and 172, respectively, until the detent rollers 220 and 230 align with such off-center cam surfaces. This feature also reduces friction in the steering gear 10.

From the above description of the invention, those skilled in the art will perceive improvements, changes and modifications. For example, it is contemplated that the detent rollers could have a spherical shape and the associated cam surfaces and detent surfaces would be shaped correspondingly. Such improvements, changes and modifications within the skill of the art are intended to be covered by the appended claims.

Having described the invention, we claim:

1. A hydraulic power steering gear for a vehicle, said hydraulic power steering gear being operable between a neutral condition and an actuated condition, said hydraulic power steering gear comprising:

first and second valve members disposed coaxial to one another and which are rotatable about a first axis relative to one another to selectively port hydraulic fluid, said first valve member having an axial bore associated with said first valve member, said axial bore having a second axis which extends parallel to said first axis, said second valve member including a cam surface;

a plunger disposed in said axial bore for movement along said second axis, said plunger having a detent surface;

spring means for biasing said plunger axially toward said second valve member; and a detent roller acting between said first and second valve members, said detent roller being located in said cam surface and in said detent surface in the neutral condition to provide a physically perceptible indication to a driver of the vehicle of operation between the neutral condition and the actuated condition.

2. The hydraulic power steering gear of claim 1 wherein said spring means comprises a plurality of ring-shaped springs having an axially undulating configuration.

3. The hydraulic power steering gear of claim 1 further comprising a ring member fixedly attached to said first valve member, said axial bore being formed in said ring member.

4. The hydraulic power steering gear of claim 1 further comprising a torsion bar acting between said first and second valve members.

5. The hydraulic power steering gear of claim 1 wherein said second valve member has diametrically opposed first and second cam surfaces, said hydraulic power steering gear including diametrically opposed first and second plungers and diametrically opposed first and second detent rollers.

6. The hydraulic power steering gear of claim 1 wherein said plunger has a cylindrical outer surface.

7. The hydraulic power steering gear of claim 1 wherein said cam surface and said detent surface extend in a radial direction.

8. The hydraulic power steering gear of claim 1 wherein said detent roller moves out of said cam surface and out of said detent surface in the actuated condition.

9. The hydraulic power steering gear of claim 1 wherein said detent roller is a transversely extending cylindrical pin, each of said cam surface and said detent surface having a transversely extending semi-cylindrical configuration.

10. The hydraulic power steering gear of claim 1 wherein said plunger is rotatable in said axial bore about said second axis to ensure proper alignment of said detent roller in said cam surface.

11. The hydraulic power steering gear of claim 1 wherein said plunger includes parallel first and second end surfaces, said detent surface being formed in said first end surface, said spring means acting against said second end surface.

12. The hydraulic power steering gear of claim 1 wherein said plunger moves axially away from said first valve member against the bias of said spring means upon operation of said hydraulic power steering gear from the neutral condition to the actuated condition.

13. The hydraulic power steering gear of claim 1 wherein the torque necessary to rotate said first valve member relative to said second valve member reduces from an initially relatively high torque to a subsequent relatively low torque upon continued rotation of said first valve member.

14. The hydraulic power steering gear of claim 1 wherein said first valve member comprises a valve core and said second valve member comprises a valve sleeve.

15. A hydraulic power steering gear for a vehicle, said hydraulic power steering gear being operable between a neutral condition and an actuated condition, said hydraulic power steering gear comprising:

a first valve member;

a second valve member partially encircling said first valve member, said first and second valve members being rotatable about a first axis relative to one another to selectively port hydraulic fluid, said second valve member including a radially extending cam surface;

a ring member attached to said first valve member, said ring member including a central opening centered on said first axis and an axial bore centered on a second axis lying parallel to said first axis;

a plunger disposed in said axial bore in said ring member for movement along said second axis, said plunger having a cylindrical outer surface extending between parallel first and second end surfaces, said first end surface including a radially extending detent surface;

spring means for biasing said plunger axially toward said second valve member, said spring means encircling said first valve member and acting against said second end surface of said plunger; and a detent roller acting between said first and second valve members, said detent roller being disposed in said first cam surface and in said detent surface in the neutral condition to provide a physically perceptible indication to a driver of the vehicle of operation between the neutral condition and the actuated condition.

16. The hydraulic power steering gear of claim 15 wherein said spring means comprises a plurality of ring-shaped springs having an axially undulating configuration.

17. The hydraulic power steering gear of claim 15 further comprising a torsion bar acting between said first and second valve members.

18. The hydraulic power steering gear of claim 15 wherein said second valve member has diametrically opposed first and second cam surfaces, said hydraulic power steering gear including diametrically opposed first and second plungers and diametrically opposed first and second detent rollers, said second detent roller for cooperating with said second plunger and said second cam surface.

19. The hydraulic power steering gear of claim 15 wherein said detent roller moves out of said cam surface and out of said detent surface in the actuated condition.

20. The hydraulic power steering gear of claim 15 wherein said plunger moves axially away from said first valve member against the bias of said spring means upon operation of said hydraulic power steering gear from the neutral condition to the actuated condition.

21. The hydraulic power steering gear of claim 15 wherein said first valve member comprises a valve core and said second valve member comprises a valve sleeve.

* * * * *